(12) United States Patent
Cogan et al.

(10) Patent No.: US 9,843,472 B1
(45) Date of Patent: Dec. 12, 2017

(54) SYSTEM, METHOD, AND COMPUTER PROGRAM FOR IDENTIFICATION OF COMMON ROOT CAUSES WITH SEQUENTIAL PATTERNS

(71) Applicant: Amdocs Development Limited, Limassol (CY)

(72) Inventors: Peter John Cogan, Dublin (IE); John Henry Hannon, Dublin (IE); Michael Richard Kerrigan, Dublin (IE)

(73) Assignee: Amdocs Development Limited, Limassol (CY)

( * ) Notice: Subject to any disclaimer, the term of this patent is extended or adjusted under 35 U.S.C. 154(b) by 0 days.

(21) Appl. No.: 15/043,311

(22) Filed: Feb. 12, 2016

Related U.S. Application Data

(63) Continuation of application No. 14/262,606, filed on Apr. 25, 2014, now Pat. No. 9,294,631.

(60) Provisional application No. 61/908,713, filed on Nov. 25, 2013.

(51) Int. Cl.
*H04M 15/00* (2006.01)
*H04L 12/24* (2006.01)
*G06F 17/16* (2006.01)

(52) U.S. Cl.
CPC .......... *H04L 41/0631* (2013.01); *G06F 17/16* (2013.01); *H04M 15/70* (2013.01)

(58) Field of Classification Search
CPC .............. G06F 11/079; G06F 11/0709; G06F 11/0748; G06F 21/552; G06F 21/554; H04L 69/40; H04L 41/069; H04L 41/0631; H04L 43/0805
See application file for complete search history.

(56) References Cited

U.S. PATENT DOCUMENTS

| | | | |
|---|---|---|---|
| 8,032,866 B1 * | 10/2011 | Golender .............. | G06F 11/366 717/128 |
| 8,612,802 B1 * | 12/2013 | Havemose .......... | G06F 11/0715 714/26 |
| 2002/0087289 A1 * | 7/2002 | Halabieh ............... | G06F 9/4443 702/181 |
| 2009/0024618 A1 * | 1/2009 | Fan .................... | G06F 17/30327 |
| 2014/0019569 A1 * | 1/2014 | Sharma ................. | G06F 9/5066 709/208 |
| 2014/0297323 A1 * | 10/2014 | Hu ........................ | G06Q 50/24 705/3 |

* cited by examiner

*Primary Examiner* — Kashif Siddiqui
*Assistant Examiner* — Minjung Kim
(74) *Attorney, Agent, or Firm* — Zilka-Kotab, PC

(57) ABSTRACT

A system, method, and computer program product are provided for identification of common root causes with sequential patterns. In use, a plurality of customer event sequences are identified. Additionally, the plurality of customer event sequences are grouped into a hierarchical framework of patterns. Further, a root-cause analysis (RCA) is performed for the customer event sequences utilizing the hierarchical framework of patterns.

16 Claims, 4 Drawing Sheets

SYSTEM, METHOD, AND COMPUTER PROGRAM FOR IDENTIFICATION OF COMMON ROOT CAUSES WITH SEQUENTIAL PATTERNS

CLAIM OF PRIORITY

This application is a continuation of U.S. application Ser. No. 14/262,606, filed Apr. 25, 2014, which claims the benefit of U.S. Provisional Application No. 61/908,713, filed Nov. 25, 2013, the entire contents of which are incorporated herein by reference.

FIELD OF THE INVENTION

The present invention relates to root-cause analysis, and more particularly to identifying patterns in event sequences for performing root-cause analysis.

BACKGROUND

Subscribers of telecommunications networks may experience events, such as roaming, billing, and overages, etc., which form a distinct process in their customer lifecycle. Each event sequence can be unique to the subscriber. Similarly, a user purchasing a new service may experience a different event sequence defined by their unique combination of service configuration, options, add-ons, billing information, etc.

In these dynamic environments, issues may arise which lead to poor customer experience. These issues may include systematic errors with process handling or configuration problems related to a specific product and/or service. Moreover, these issues may be embedded within a possibly lengthy and complex sequence of events.

There is thus a need for addressing these and/or other issues associated with the prior art.

SUMMARY

A system, method, and computer program product are provided for identification of common root causes with sequential patterns. In use, a plurality of customer event sequences are identified. Additionally, the plurality of customer event sequences are grouped into a hierarchical framework of patterns. Further, a root-cause analysis (RCA) is performed for the customer event sequences utilizing the hierarchical framework of patterns.

DETAILED DESCRIPTION

Figure 1:
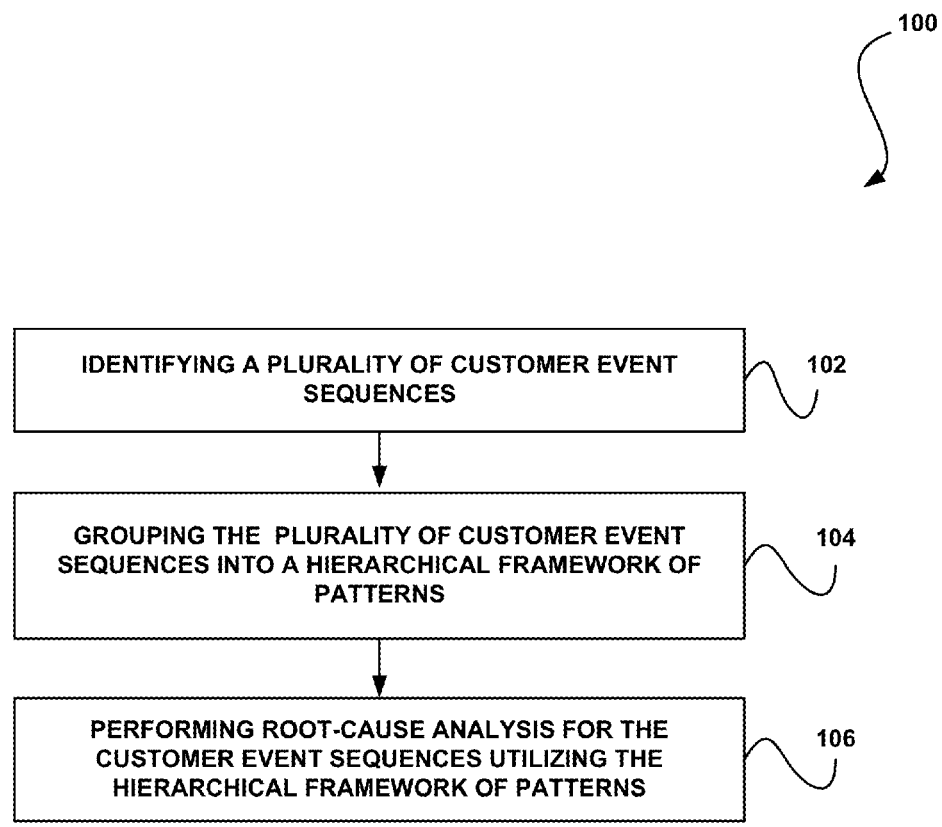
FIG. 1 illustrates a method for identification of common root causes with sequential patterns, in accordance with one embodiment.

FIG. 1 illustrates a method 100 for identification of common root causes with sequential patterns, in accordance with one embodiment.

As shown, a plurality of customer event sequences are identified. See operation 102. The customer sequence events may be associated with any type of industry. For example, in on embodiment, the customer sequence events may be associated with a telecommunication service provider.

Additionally, the customer sequence events may include any event. For example, in various embodiments, the customer sequence events may include roaming events, billing events, overage events, and/or any other type of event.

As shown further in FIG. 1, the plurality of customer event sequences are grouped into a hierarchical framework of patterns. See operation 104. Further, a root-cause analysis is performed for the customer event sequences utilizing the hierarchical framework of patterns. See operation 106.

For example, in dynamic environments, issues may arise which lead to poor customer experience. These issues may include systematic errors with process handling or configuration problems related to a specific product and/or service. In order to identify those root-causes, common event sequences experienced by each customer may be grouped. Such a group is termed a pattern. Once these patterns are formed, it becomes possible to establish the root-cause of the issue using domain knowledge of the underlying process.

These patterns are embedded within a possibly lengthy and complex sequence of events which make up the customer journey. As the number of patterns can be extremely large, unique customer event sequences may be grouped into patterns in a hierarchical framework such that the hierarchical framework may be utilized to perform a root-cause analysis.

In one embodiment, grouping the plurality of customer event sequences into the hierarchical framework of patterns may include performing an event clustering operation, a sequence clustering operation, and a temporal clustering operation.

In the context of the present description, an event clustering operation refers to a step or series of steps that functions to group event sequences based on an event type. The sequence clustering operation refers to a step or series of steps that functions to group the customer event sequences based on an order in which the plurality of customer event sequences occur.

The temporal clustering operation refers to a step or series of steps that functions to group the customer event sequences based on a duration of events in the plurality of customer event sequences. In one embodiment, the temporal clustering operation may function to group the plurality of customer event sequences further based on a time gap between successive events of the plurality of customer event sequences.

In one embodiment, grouping the customer event sequences into the hierarchical framework of patterns by performing the event clustering operation, the sequence clustering operation, and the temporal clustering operation may function to identify dominant patterns in the customer event sequences. Further, in one embodiment, the event clustering operation and the temporal clustering operation may function to identify standard and/or expected sub-sequences associated with the customer event sequences. In this case, the sub-sequences not identified as standard and/or expected sub-sequences may be identified as being significant to the root-cause analysis and may thus be utilized to perform the root-cause analysis for the customer event sequences.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
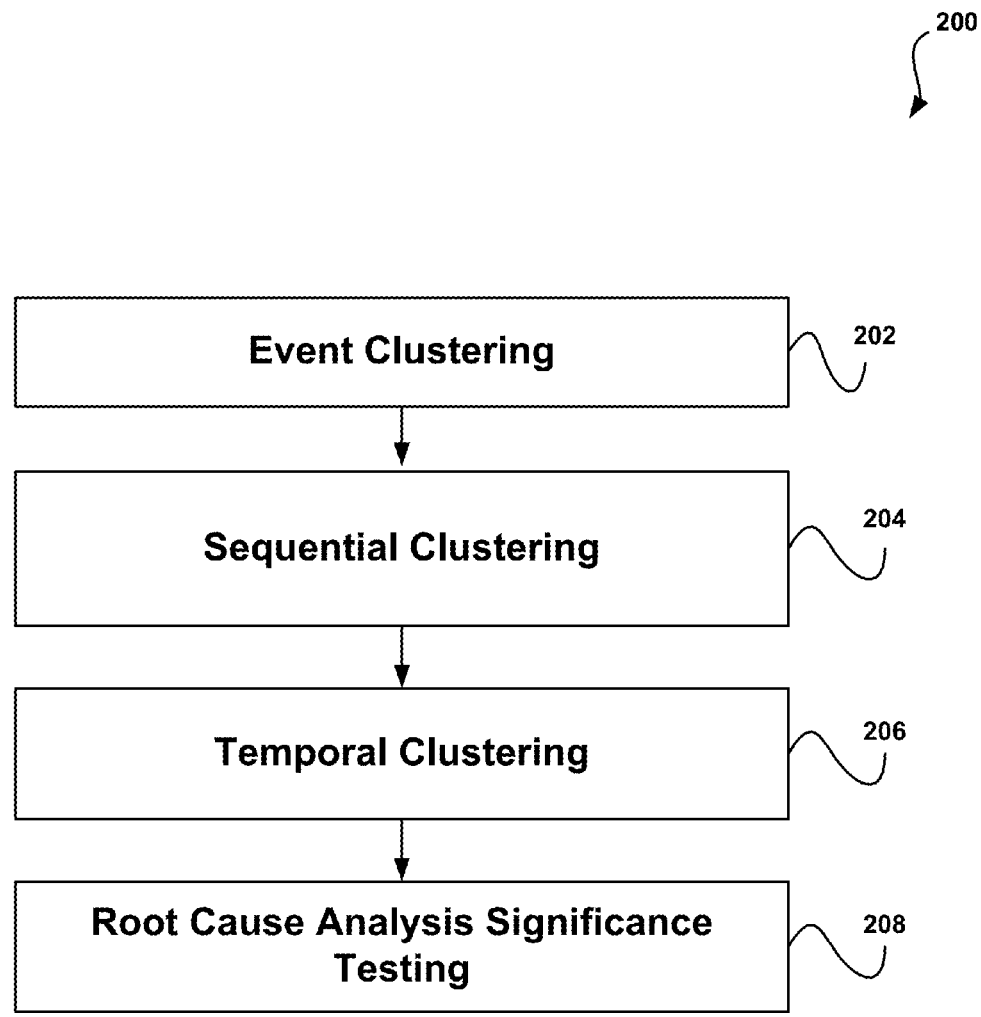
FIG. 2 illustrates a flow diagram for identification of common root causes with sequential patterns, in accordance with one embodiment.

FIG. 2 illustrates a flow diagram 200 for identification of common root causes with sequential patterns, in accordance with one embodiment. As an option, the flow diagram 200 may be implemented in the context of the details of FIG. 1. Of course, however, the flow diagram 200 may be implemented in the context of any desired environment. Further, the aforementioned definitions may equally apply to the description below.

FIG. 2 shows a general methodology flow for grouping patterns which lead to some outcome from sequences of events. For a given number of possible event types (N), the total number of sequences that may be experienced may be extremely large. To mitigate this issue, and to support a hierarchical framework, the methodology includes three main clustering steps 202, 204, and 206 (e.g. which may not include data cleaning/ingestion, etc.) and a supplementary fourth step 208 related to Root Cause Analysis Significance Testing.

Each of the three main clustering steps represent a drill down opportunity, as the clusters produced in operation 202 may be drilled into in operation 204. Similarly, the clusters operation 204 may be drilled into in operation 206. As shown, the three clustering steps are event clustering 202, sequential clustering 204, and temporal clustering 206.

The event clustering step 202 brings together event sequences which are drawn from the same set of event types. For example, one identified cluster may contain events relating to billing and roaming, whereas another identified cluster may bring together events related to billing and data overage. An event type (e.g. billing, etc.) is not restricted to a single cluster. This grouping provides the first level of the drill down hierarchy and provides clear separation of the customer journeys.

The sequential clustering step 204 operates independently on each of the clusters identified in the event clustering step 202. In this step, the order in which events occur is considered. For example, this step supports differentiation between an event sequence A,B,C and an event sequence C,A,B. In context, these different orderings may support meaningfully different customer journeys that would otherwise appear in the same event cluster (as they contain the same events). This differentiation ability provides the second level of the drill down hierarchy.

The temporal clustering step 206 operates independently on each of the clusters identified in the sequential clustering step 204. In this step, the duration of events and the time gap between successive events is considered. For example, this step supports differentiation between the identical sequences $$A \xrightarrow{\delta t_1} B \xrightarrow{\delta t_2} C$$

and $$A \xrightarrow{\delta t_3} B \xrightarrow{\delta t_2} C.$$

Although the sequences are identical, the time gap between successive pairs is significantly different. In this case, $\delta t_1 \approx \delta t_2$ but $\delta t_3 \gg \delta t_2$. The existence of different time spans between events can be indicative of different patterns within customer journeys. The technique also supports differentiation of the sequence A→B→C where the duration of A (or any event) can have significant variability. This temporal differentiation provides the third and final level of the drill down hierarchy.

The three-step methodology as described in FIG. 2 is tuned to identify the most dominant patterns in the set of customer journeys. However, intuitively most dominant patterns which will emerge will be those related to standard and expected elements of the process. For example, every customer journey may begin with a bill being created and delivered to the customer. From a root-cause analysis perspective, although these events are important, they are not necessarily part of the issue that must be addressed. Thus, a method for determining the significance of a pattern is beneficial.

To accomplish this, in one embodiment, two datasets may be used. One dataset may include the issue to be diagnosed. A second dataset may not include the issue to be diagnosed. By establishing the patterns that occur in the dataset where no issue is present, those patterns which are standard and expected elements of the process may be identified. This then supports the identification of those patterns which contribute to the root cause issue using the other dataset.

The input data to operation 202 includes a list of event sequences. The entire event sequence experienced by a single entity (customer/subscriber, etc.) is termed a complete sequence. Each complete sequence may have arbitrary length, and may be drawn from a finite and known list of possible event types.

Within each complete sequence, there is the possibility that one or more common event sequences (referred to as patterns) may occur. Event sequences which do not frequently occur may be regarded as noise. Thus, a single complete sequence may be viewed as a set of patterns embedded in noise, or it may be pure noise.

To illustrate, the following simple example is used. Suppose event sequences are drawn from the finite set of events A,B,C,D,E. Suppose there are three patterns {A, B, C}, {D, E, A}, {B, C, D}. A set of 5 complete sequences may look like this:

A,A,D,E,A
E,A,B,C,E,B,C,D
E,E,C,B,C,D
E,A,B,A,E,A
B,D,E,A,B

In this case, the embedded patterns are underlined, while the remainder of the sequence may be regarded as noise. Further, the complete sequences are of arbitrary length. Additionally, multiple patterns may appear in each complete sequence. In some cases, a complete sequence may contain no patterns (i.e. it is pure noise).

For implementation in an algorithm, in the first stage, the event clustering stage 202, a pre-clustering algorithm is applied. For example, in one embodiment, the complete sequences may be transformed into a new N-dimensional space where the number of dimensions, N, is given by the number of possible event types (i.e. a positive integer). Then, each complete sequence is mapped to this new space with a value of "1" if the complete sequence contains that event (at least once), and a value of "0" otherwise.

This strategy of describing the complete sequence is similar to the 'bag-of-words' methodology in text mining. Once the new N-dimensional space has been created, a Principal Component Analysis is applied. This maps the data into a new space where the first dimensions account for the greatest amount of variability. This technique enables a visualization of the data, and is helpful in verifying the clusters that are identified in the subsequent step. Finally, a clustering using KMeans Canopy clustering may be applied to identify the number and location of clusters, and to segregate each complete sequence into a specific cluster.

Using the Input Data example, the event sequences would be mapped as follows. Note for clarity, the event type is listed as a header, but is not part of the mapping.

A,B,C,D,E
1,0,0,1,1
1,1,1,1,1
0,1,1,1,1
1,1,0,0,1
1,1,0,1,1

The output of operation 202 is a mapping from each complete sequence to one of k clusters. For example, suppose k=3 clusters have been identified. Then, the output is a simple mapping as follows:

A,A,D,E,A→1
E,A,B,C,E,B,C,D→2
E,E,C,B,C,D→1
E,A,B,A,E,A→3
B,D,E,A,B→2

The data is assembled such that each complete sequence appears in a single clustered group. Each such group represents the first level of the drill down hierarchy.

For sequential clustering 204, the input to the second stage 204 is the set of sequences identified in each cluster from the first stage 202. Thus, the second stage 204 is executed for each unique cluster from the first stage 202. In the second stage 204, the list of all possible sub-sequences of all lengths of all the input set of complete sequences is determined.

For example, let $S_i$ be the set of all complete sequences in cluster i from operation 202. Let U be the set of all sub-sequences of $S_i$. For each sub-sequence $u_j \in U$, four metrics are determined.

A first metric is a "count". The count is the number of times sub-sequence $u_j$ appears in $S_i$.

A second metric is "support". The support metric is the count divided by the number of sub-sequences in $S_i$.

A third metric is "length". The length metric is the length of sub sequence $u_j$.

A fourth metric is "score". The score is the product of count and length. Table 1 shows a summary of the four metrics.

TABLE 1

$$\text{count} = |u_j \in S_i|$$

$$\text{support} = \frac{\text{count}}{|S_i|}$$

$$\text{length} = |u_j|$$
$$\text{score} = \text{count} \times \text{length}$$

The set of complete sequences is described by a set of sub-sequences termed the representative sub-sequences. The set of representative sub-sequences is iteratively assembled using the set of sub-sequences with the highest score. During iteration, if a sub-sequence is a super-sequence of one of the already-selected representative sub-sequences, then it will be skipped. Also, if a sub-sequence is a sub-sequence of one of the already-selected sub-sequences, then it will be skipped. For example, suppose the sub-sequence {A, B} is already in the set of representative sub-sequences, then the super-sequence {A, B, C} of {A, B} cannot be added, and the sub-sequence {A} of {A, B} also cannot be added.

In one embodiment, the algorithm to select the representative sub-sequences may proceed as follows. The set of representative sub-sequences is denoted as R. The set of sub-sequences is denoted as $u \in U$. The symbol $\supset$ is denoted as 'super-sequence of'. Thus, $u_i \supset u_j$ should be read that $u_i$ is a super-sequence of $u_j$. Similarly, the symbol $u_j \subset u_i$ should be read that $u_j$ is a sub-sequence of $u_i$. For example, suppose there are two sequences $u_i=\{A, B, C\}$ and $u_j=\{A, B\}$. In this case, $u_i \supset u_j$ and $u_j \subset u_i$ are written since $u_j$ is completely contained within $u_i$. The symbols $\not\subset$ and $\not\supset$ mean not a sub-sequence of and not a super-sequence of respectively.

The algorithm could proceed until all $u \in U$ have been examined. However, this may result in very rare or uninteresting patterns. Optionally, a threshold may be added to the support value to exclude rare or uninteresting patterns. The support of pattern $u \in U$ is denoted $u_s \in U$ and the minimum support threshold is denoted by T.

For each score, a set of patterns $u \in U$ may be found. This is considered in the algorithm by checking whether any of the patterns in the set is a sub-sequence of any other pattern. Only super-sequences may be added to R.

The algorithm to extract relevant sequences from the complete set of sub-sequences may include: sorting sub-sequences $u \in U$ by score in descending order; initializing R to the null set; grouping each $u \in U$ with the same score and label each group P; and iterating over $p \in P$, as shown in Table 2.

TABLE 2

- If $p_i \not\subset p_j \forall p_j \in P$
  - ■ If $P_i \not\supset r$ or $p_i \not\subset r, \forall r \in R$ and $p_s > T$
    - ○ R ← pi As an example, suppose there are the following set of complete sequences:

A,B
A,B,C
A,B,C,D
A,B
A,B,C,D,E
F,G
F,G,H
X
X,Y
X,Y,Z

Table 3 shows the complete list of sub-sequences which can be extracted from these complete sequences. The Count, Support, Length and Score as previously described are also listed. The sub-sequences are ordered by Score, thus the algorithm proceeds according to the displayed order. As the algorithm proceeds, sub-sequences are added to the set R of representative sub-sequences. If a sub-sequence is not added, the reason may be given. A threshold $T_s=0.1$ is applied.

TABLE 3

| Sub-sequence | Count | Support | Length | Score | R | Reject Reason |
|---|---|---|---|---|---|---|
| A,B | 5 | 0.5 | 2 | 10 | {A,B} | |
| A,B,C | 3 | 0.3 | 3 | 9 | {A,B} | Superset of A,B |
| A,B,C,D | 2 | 0.2 | 4 | 8 | {A,B} | Superset of A,B |
| B,C | 3 | 0.3 | 2 | 6 | {A,B},{B,C} | |
| B,C,D | 2 | 0.2 | 3 | 6 | {A,B},{B,C} | Superset of B,C |
| A | 5 | 0.5 | 1 | 5 | {A,B},{B,C} | Subset of A,B |
| B | 5 | 0.5 | 1 | 5 | {A,B},{B,C} | Subset of A,B |
| A,B,C,D,E | 1 | 0.1 | 5 | 5 | {A,B},{B,C} | Superset of {A,B}. Support below threshold |
| F,G | 2 | 0.2 | 2 | 4 | {A,B},{B,C},{F,G} | |
| C,D | 2 | 0.2 | 2 | 4 | {A,B},{B,C},{F,G},{C,D} | |
| B,C,D,E | 1 | 0.1 | 4 | 4 | {A,B},{B,C},{F,G},{C,D} | Superset of {B,C}. Support below threshold |
| X,Y | 2 | 0.2 | 2 | 4 | {A,B},{B,C},{F,G},{C,D},{X,Y} | |
| C | 3 | 0.3 | 1 | 3 | {A,B},{B,C},{F,G},{C,D},{X,Y} | Subset of {B,C} |
| F,G,H | 1 | 0.1 | 3 | 3 | {A,B},{B,C},{F,G},{C,D},{X,Y} | Superset of {F,G,H}. Support below threshold |
| C,D,E | 1 | 0.1 | 3 | 3 | {A,B},{B,C},{F,G},{C,D},{X,Y} | Superset of {C,D}. Support below threshold |
| X | 3 | 0.3 | 1 | 3 | {A,B},{B,C},{F,G},{C,D},{X,Y} | Subset of {X,Y} |
| X,Y,Z | 1 | 0.1 | 3 | 3 | {A,B},{B,C},{F,G},{C,D},{X,Y} | Superset of {X,Y}. Support below threshold |
| D | 2 | 0.2 | 1 | 2 | {A,B},{B,C},{F,G},{C,D},{X,Y} | Subset of {C,D} |
| F | 2 | 0.2 | 1 | 2 | {A,B},{B,C},{F,G},{C,D},{X,Y} | Subset of {F,G} |
| G | 3 | 0.3 | 1 | 2 | {A,B},{B,C},{F,G},{C,D},{X,Y} | Subset of {F,G} |
| G,H | 1 | 0.1 | 2 | 2 | {A,B},{B,C},{F,G},{C,D},{X,Y} | Support below threshold |
| D,E | 1 | 0.1 | 2 | 2 | {A,B},{B,C},{F,G},{C,D},{X,Y} | Support below threshold |
| Y | 2 | 0.2 | 1 | 2 | {A,B},{B,C},{F,G},{C,D},{X,Y} | Subset of {X,Y} |
| Y,Z | 1 | 0.1 | 2 | 2 | {A,B},{B,C},{F,G},{C,D},{X,Y} | Support below threshold |
| E | 1 | 0.1 | 1 | 1 | {A,B},{B,C},{F,G},{C,D},{X,Y} | Support below threshold |
| Z | 1 | 0.1 | 1 | 1 | {A,B},{B,C},{F,G},{C,D},{X,Y} | Support below threshold |

Finally, the population of R is {A, B}, {B, C}, {C, D}, {F, G}, {X, Y}.

The input to the third stage 206 is the set of representative sub-sequences r ∈ R identified in the second stage 204. The third stage 206 is performed independently for each r∈R. There are several ways in which temporal information may manifest itself within a sequence of events. Events may be instantaneous, or they may have some duration. There may be idle time between events (i.e. wherein the end time of event N occurs before the start time of event N+1). Thus, the complete temporal data may be captured as a sequence of durations (where any given duration may have value 0 in the case of instantaneous events or instantaneous transitions between events).

For a sequence of length N there are N durations and N−1 inter-event durations. Thus, the set of sub-sequences in r are mapped to a new dimensional space of size 2N−1. Similar to event clustering, a Principal Component Analysis is applied to this mapping to project into a dimensional space wherein the first dimensions contain the most variance. KMeans Canopy clustering may be applied to identify groupings.

For example, suppose there is a sequence of events A,B,C,D. Event B is instantaneous, and event D follows immediately after event C. This sequence could be described as follows:

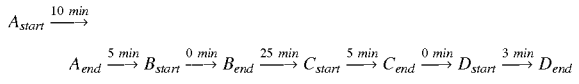

Event A takes 10 minutes followed by a 5 minute idle time. Event B is instantaneous, but there is a 25 minute idle time before event C. Event C takes 5 minutes, and event D occurs instantaneously at the end of event C. Finally, event D takes 3 minutes. A set of such sequences could look a follows:

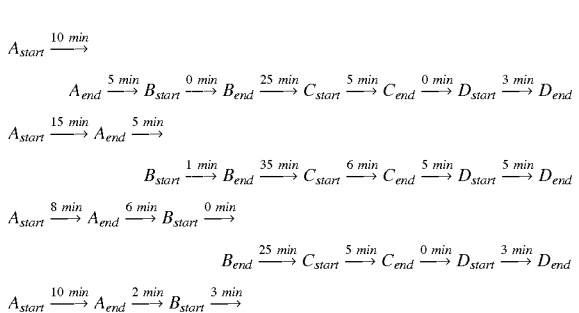

-continued

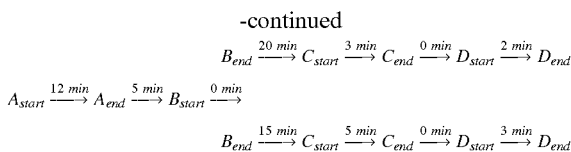

This is placed into an array of dimension 2N−1=7:

$$\begin{pmatrix} 10 & 5 & 0 & 25 & 5 & 0 & 3 \\ 15 & 5 & 1 & 35 & 6 & 5 & 5 \\ 8 & 6 & 0 & 25 & 5 & 0 & 3 \\ 10 & 2 & 3 & 20 & 3 & 0 & 2 \\ 12 & 5 & 0 & 15 & 5 & 0 & 3 \end{pmatrix}$$

Principal Component Analysis maps this space to a new space where the first two dimensions describe the most variance. KMeans Canopy clustering may be applied to identify the existence of clusters. The final result provides a set of clustered sub-sequences, where the clustering is defined by their temporal behavior. Even though each sub-sequence is identical in terms of the ordering of events, this stage identifies and extracts groupings according to temporal distribution. This is the final level in the drill down hierarchy and supports a fine grained analysis of clustered sub-sequences in the temporal domain.

With respect to Root Cause Analysis Significance Testing, if the methodology was applied to some standard set of process data, then one would expect the highest-scoring clusters to be those which correspond to standard and expected elements of the process. For example, it could be that every complete sequence begins with A, B, C or that every complete sequence ends with X, Y, Z. Although these sub-sequences would score highly, they constitute noise from a Root Cause Analysis.

The final step of the methodology is to identify sub-sequences which are significant to Root Cause Analysis. This can be done by identifying and removing sub-sequences which are either known from domain knowledge to be standard and expected elements of the complete sequence, or can be identified by comparing the existence of sub-sequences in different datasets. For example, suppose there are two datasets A and B which comprise complete sequences from some arbitrary process. The only difference between A and B is that the complete sequences in set B resulted in some process failure or issue. Operations 202 and 206 are applied to dataset A to identify the standard and expected sub-sequences. A substitution is then applied to dataset B, and the three clustering stages are then applied to dataset B.

For example, suppose from dataset A three standard and expected sub-sequences have been identified which are labeled $\{P_1, P_2, P_3\}$, where $P_1=\{A, B\}$, $P_2=\{C, D\}$, $P_3=\{E, F\}$. Additionally, suppose the dataset B is as follows:

A,B,M,N,C,D
A,E,F,G,H

After substitution, B is as follows:

$P_1$, M, N, $P_3$
A, $P_2$, G, H

Now the three stage sequence mining can be applied to B, where $P_1 \in P$ become part of the detected sub-sequences. Those sub-sequences detected in B can be assumed to be different from those in A and as a result are a contributory factor to the failure or issue experienced by the complete sequences in B.

The sub-sequences discovered in dataset B may be ranked simply according to the score method described earlier. However, with further supporting data they may be ranked in other ways (e.g. according to business policy, etc.). There may be multiple types of failures, some of which may have more impact than others. For example, suppose a certain type of failure leads to customer churn. Even though this sub-sequence may have a lower score (based on frequency and length), from a Root Cause Analysis perspective, the operator may wish to focus on that sub-sequence first as churn is an important issue. In other words, in one embodiment, customer event sequences in the hierarchical framework of patterns may be ranked according to one or more business policies.

Utilizing the techniques described herein, companies may seek to extract value from large, diverse data sources. Further, actionable insights may be identified from the data. Additionally, the techniques described herein may be implemented in areas where root-cause analysis of sequential events could provide significant benefits, including network event root-cause analysis, churn related to customer journeys, and installation process issues, etc.

Figure 3:
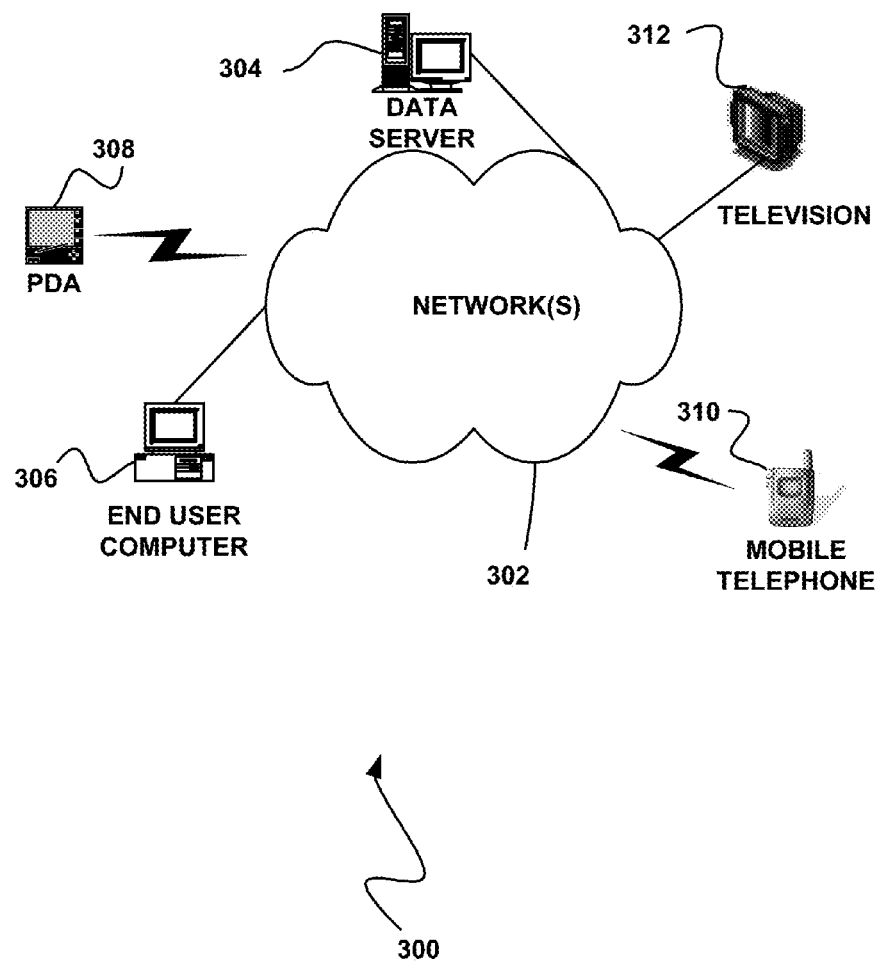
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
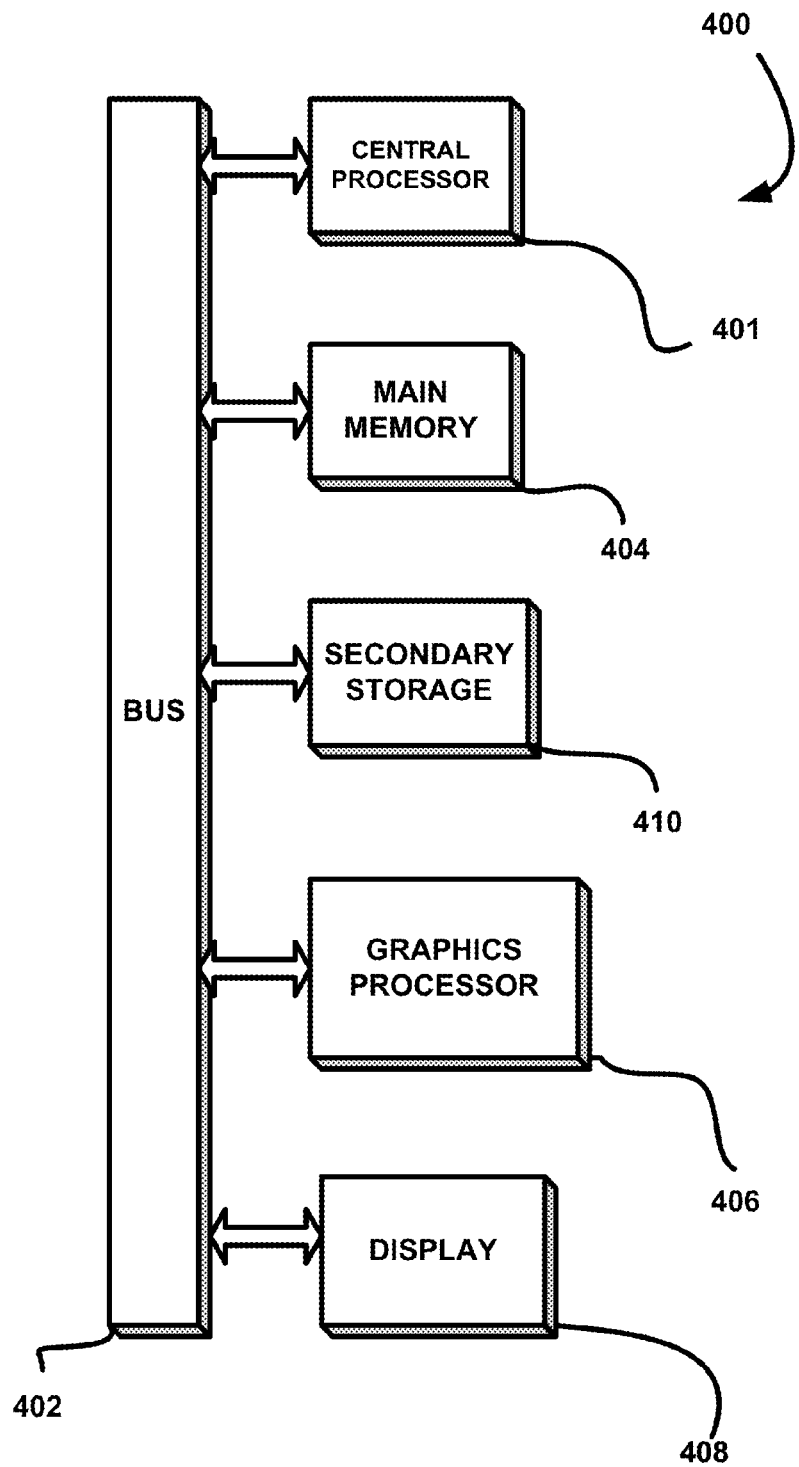
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:
   identifying, by a system, a plurality of event sequences, each of the plurality of event sequences including a plurality of events associated with a predetermined entity that occur in a particular order;
   grouping, by the system, the plurality of event sequences into a hierarchical framework of patterns, including:
      organizing the plurality of event sequences into a first set of groups based on an event type,
      for each first group of the first set of groups, organizing the plurality of event sequences within the first group into a second set of groups based on an event ordering, and
      for each second group of the second set of groups, organizing the plurality of event sequences within the second group into a third set of groups based on a time duration; and
   performing, by the system, a root-cause analysis for the plurality of event sequences utilizing the hierarchical framework of patterns;
   identifying, by the system as a result of the root-cause analysis, one or more root-causes of one or more issues associated with the plurality of event sequences.

2. The computer program product of claim 1, wherein grouping the plurality of event sequences into a hierarchical framework of patterns includes transforming the plurality of event sequences into an N-dimensional space, where N is a positive integer equal to a total number of possible event types.

3. The computer program product of claim 2, wherein grouping the plurality of event sequences into a hierarchical framework of patterns includes mapping the plurality of event sequences in the N-dimensional space.

4. The computer program product of claim 1, wherein grouping the plurality of event sequences into a hierarchical framework of patterns includes determining a list of all possible sub-sequences of all lengths for all of the plurality of event sequences.

5. The computer program product of claim 4, wherein grouping the plurality of event sequences into a hierarchical framework of patterns includes generating a set of representative sub-sequences from the possible sub-sequences.

6. The computer program product of claim 5, wherein generating the set of representative sub-sequences from the possible sub-sequences includes iteratively assembling the set of representative sub-sequences using sub-sequences with a highest score, the score being based on a product of a length of a particular sub-sequence and a number of occurrences of the particular sub-sequence in the plurality of event sequences.

7. The computer program product of claim 6, further comprising utilizing a threshold to exclude rare patterns.

8. The computer program product of claim 7, wherein the threshold is based on the number of occurrences of the particular sub-sequence in the plurality of event sequences divided by a number of subsequences in the plurality of event sequences.

9. The computer program product of claim 1, wherein grouping the plurality of event sequences into a hierarchical framework of patterns includes grouping the plurality of event sequences based on a time gap between successive events of the plurality of event sequences.

10. The computer program product of claim 9, wherein an existence of different time spans between events of the plurality of event sequences indicates different patterns.

11. The computer program product of claim 1, wherein grouping the plurality of event sequences into a hierarchical framework of patterns functions to identify dominant patterns in the plurality of event sequences.

12. The computer program product of claim 1, wherein grouping the plurality of event sequences into a hierarchical framework of patterns functions to identify standard or expected sub-sequences associated with the plurality of event sequences.

13. The computer program product of claim 12, wherein sub-sequences not identified as standard or expected sub-sequences are identified as significant to root-cause analysis and are utilized to perform the root-cause analysis for the event sequences.

14. The computer program product of claim 1, further comprising ranking the plurality of event sequences in the hierarchical framework of patterns according to one or more business policies.

15. A method, comprising:
   identifying, by a system, a plurality of event sequences, each of the plurality of event sequences including a plurality of events associated with a predetermined entity that occur in a particular order;
   grouping, by the system, the plurality of event sequences into a hierarchical framework of patterns, including:
      organizing the plurality of event sequences into a first set of groups based on an event type,
      for each first group of the first set of groups, organizing the plurality of event sequences within the first group into a second set of groups based on an event ordering, and
      for each second group of the second set of groups, organizing the plurality of event sequences within the second group into a third set of groups based on a time duration; and
   performing, by the system, a root-cause analysis for the plurality of event sequences utilizing the hierarchical framework of patterns;
   identifying, by the system as a result of the root-cause analysis, one or more root-causes of one or more issues associated with the plurality of event sequences.

16. A system comprising:
   a memory system; and
   one or more processing cores coupled to the memory system and that are each configured for:
   identifying a plurality of event sequences, each of the plurality of event sequences including a plurality of events associated with a predetermined entity that occur in a particular order;
   grouping the plurality of event sequences into a hierarchical framework of patterns, including:
      organizing the plurality of event sequences into a first set of groups based on an event type,
      for each first group of the first set of groups, organizing the plurality of event sequences within the first group into a second set of groups based on an event ordering, and for each second group of the second set of groups, organizing the plurality of event sequences within the second group into a third set of groups based on a time duration; and performing a root-cause analysis for the plurality of event sequences utilizing the hierarchical framework of patterns;

identifying, as a result of the root-cause analysis, one or more root-causes of one or more issues associated with the plurality of event sequences.

* * * * *